(12) United States Patent
Kenney

(10) Patent No.: US 8,681,516 B2
(45) Date of Patent: Mar. 25, 2014

(54) INVERTER WITH SHORT CIRCUIT PROTECTION

(75) Inventor: Richard Kenney, Crewe (GB)

(73) Assignee: Siemens Aktiengesellschaft, Munich (DE)

( * ) Notice: Subject to any disclaimer, the term of this patent is extended or adjusted under 35 U.S.C. 154(b) by 590 days.

(21) Appl. No.: 12/674,737

(22) PCT Filed: Jul. 4, 2008

(86) PCT No.: PCT/EP2008/058669

§ 371 (c)(1),
(2), (4) Date: Apr. 12, 2011

(87) PCT Pub. No.: WO2009/024391

PCT Pub. Date: Feb. 26, 2009

(65) Prior Publication Data

US 2011/0182092 A1  Jul. 28, 2011

(30) Foreign Application Priority Data

Aug. 23, 2007  (EP) .................................... 07114835

(51) Int. Cl.
*H02P 23/12* (2006.01)

(52) U.S. Cl.
USPC ............................ 363/37; 363/56.03; 318/807

(58) Field of Classification Search
USPC ............. 363/16–20, 37, 41, 56.03, 56.11, 97,
363/98, 132; 318/139, 400.02, 632, 606,
318/807, 811; 361/58, 103, 93.01
See application file for complete search history.

(56) References Cited

U.S. PATENT DOCUMENTS

| | | | |
|---|---|---|---|
| 4,099,225 A * | 7/1978 | Nygaard | 363/56.03 |
| 4,291,265 A | 9/1981 | Kawada et al. | |
| 5,123,746 A * | 6/1992 | Okado | 363/37 |
| 5,877,950 A * | 3/1999 | Bonsignour et al. | 363/98 |
| 5,945,802 A * | 8/1999 | Konrad et al. | 318/807 |
| 6,812,666 B2 | 11/2004 | Takahashi et al. | |
| 7,432,694 B2 * | 10/2008 | Brenden et al. | 323/283 |
| 2007/0010967 A1 | 1/2007 | Scherr | |

FOREIGN PATENT DOCUMENTS

| | | |
|---|---|---|
| EP | 1 035 642 | 9/2000 |
| WO | WO 02/23736 | 3/2002 |

* cited by examiner

*Primary Examiner* — Rajnikant Patel
(74) *Attorney, Agent, or Firm* — Schiff Hardin LLP

(57) ABSTRACT

An inverter has a current sensor that senses a low side current before a high side of the inverter is permitted to power up. If an over-current situation is detected on the low side, powering up is prevented in order to avoid damage to the rectifier.

7 Claims, 2 Drawing Sheets

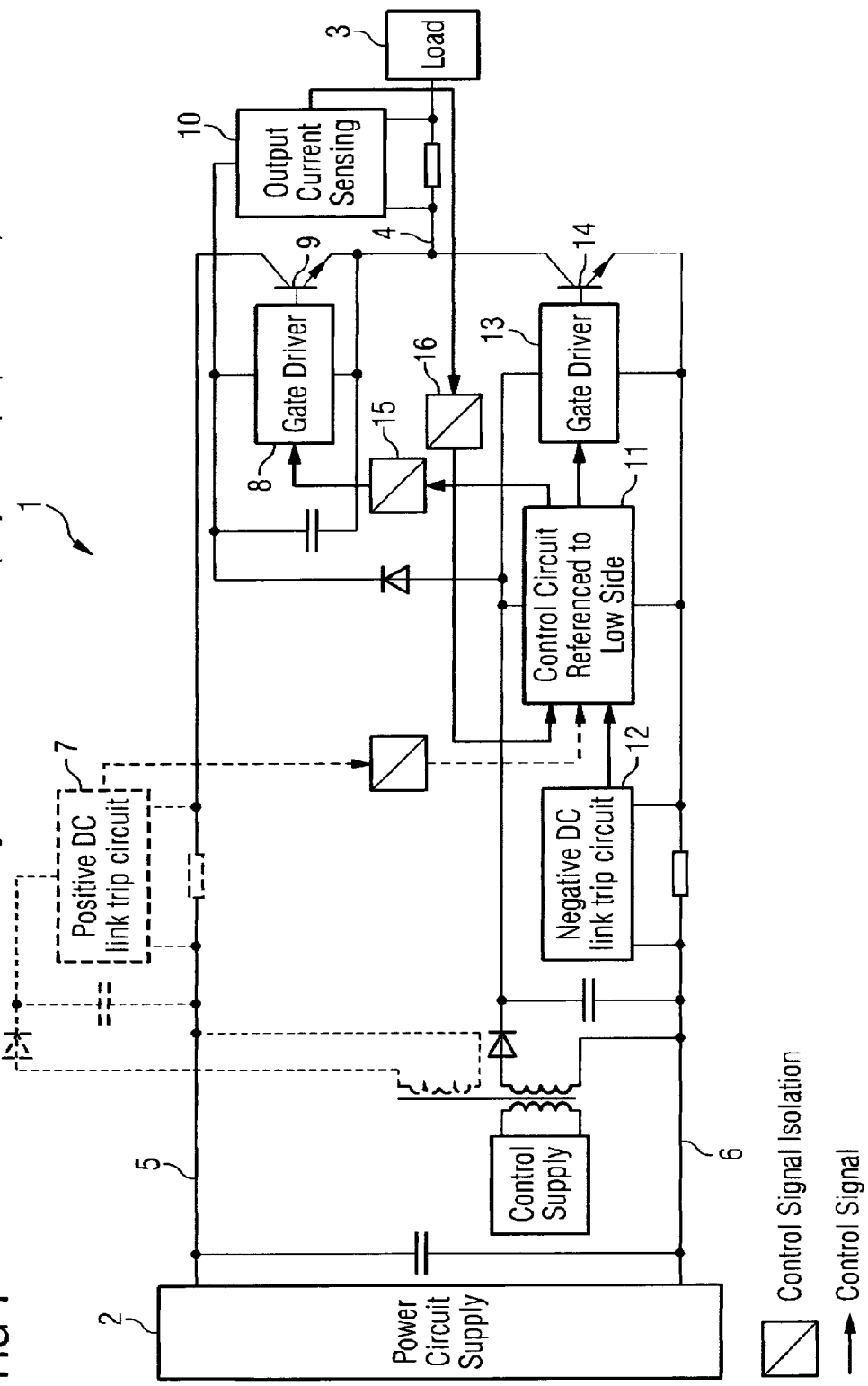

INVERTER WITH SHORT CIRCUIT PROTECTION

BACKGROUND OF THE INVENTION

1. Field of the Invention

This invention relates to an inverter with short circuit protection.

2. Description of the Prior Art

Industrial voltage source inverters generally consist of a DC voltage source such as a mains rectifier and smoothing capacitor connected to outputs by switching elements which are driven by Pulse Width Modulation control signals to generate the required output voltages. These circuits require short circuit protection to prevent damage to the components if the outputs are shorted.

Short circuit protection is often provided by the use of current sensors which allow closed loop control of the output current. It is necessary to ensure that these sensors are powered and operational before the outputs of the rectifier are enabled.

Inverters have upper and lower outputs and bootstrapping is used to provide power to gate drivers of the upper output. Bootstrapping involves the use of a diode between the gate drive power supply and a supply referenced to the negative DC link. This cannot be used however if phase current monitoring is employed since the current sensors will not be powered up until after the output devices are switched on. EPO431492 describes such a device.

SUMMARY OF THE INVENTION

According to the invention an inverter has a high and low side, and has low and high side switching elements, and a low side current sensor for sensing the current at the low side during at least a first phase of initiation of the inverter, an output current senor for, in use, monitoring the current provided by the inverter to a load, a control circuit to control low and high side switching elements and responsive to a signal from the output current sensor indicating that the sensor is operating to power up the high side switching element.

Since power control is referenced to the low side the components used may be compact and inexpensive. The cost of the protected inverter is therefore less than conventional arrangements.

The low side is powered up first and the high side powered up if the non-over current condition is determined on the low side. This is preferable since it the components used to do this may be more compact than would otherwise be the case.

BRIEF DESCRIPTION OF THE DRAWINGS

FIG. 1 shows the circuitry concerned with one output phase of an inverter in accordance with an embodiment of the invention connected to a power supply unit and a load.

DESCRIPTION OF THE PREFERRED EMBODIMENTS

Figure 2A:
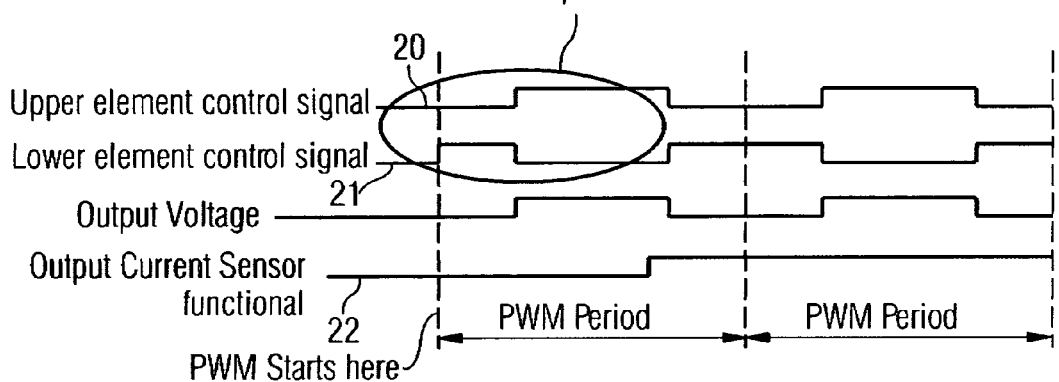
FIGS. 2A and 2B respectively show control waveform timings.

As is shown in FIG. 1, an inverter 1 is connected to a power supply unit 2 and a load 3. The inverter 1 uses well known pulse width modulation techniques to provide the required voltage to the load 3 from output 4.

The inverter 1 has a high side and a low side. The diagram shows only one output phase.

The high side includes a high voltage rail 5 (a current sensor 7 shown in broken outline is a component which would have been present in the prior art but is omitted by the use of the invention) a gate drive 8 and a switch 9 providing an output 4 which is monitored by an output current sensor 10.

The low side includes a control circuit 11 referenced to the low side voltage rail 6, a low side current sensor and trip 12, a gate driver 13, and a switch 14 to which the gate driver is coupled which provides an output to the output 4.

The control circuit 11 is microprocessor based and controls the operation of all components. It provides a control output to the gate driver 8 via a signal isolator 15 and receives inputs for the output current sensor 10 via isolator 16 and from the low side current sensor 12. In the diagram it is shown as also receiving a signal from the current sensor 7 but this is to illustrate the advantage over the prior art arrangements which require such a circuit.

The control circuit 11 is referenced to the low voltage side and provides a control signal via the isolator 15 to the gate drive 8 which then drives the switch 9. The control circuit 11 is able to provide a control signal directly to the gate drive 13 because it is at the low side voltage to control the activation of the switch 14.

With the lower switch 14 on, the output to the load is monitored by the output current sensor 10. The control circuit 11 is responsive to the signal of the output current sensor 10 indicating it is operational. The control 11 circuit is then able to switch the upper switch 9 on via a control signal to the gate driver 8.

The lower switch 14 is protected against a short circuit before the output current sensor 10 is fully operational by the lower current sensor and trip 12. If the current is detected as being excessive then this will cause a trip signal to the controller circuit 11 which will then send a switch off signal to the gate drive which in turn will set the switch 14 to off.

When the output current sensor 10 is operational if a current overload condition occurs then a signal is sent to the control circuit 11 which then responds by setting the switches 9, 14 to off by control signals to their respective drivers.

Figure 2B:
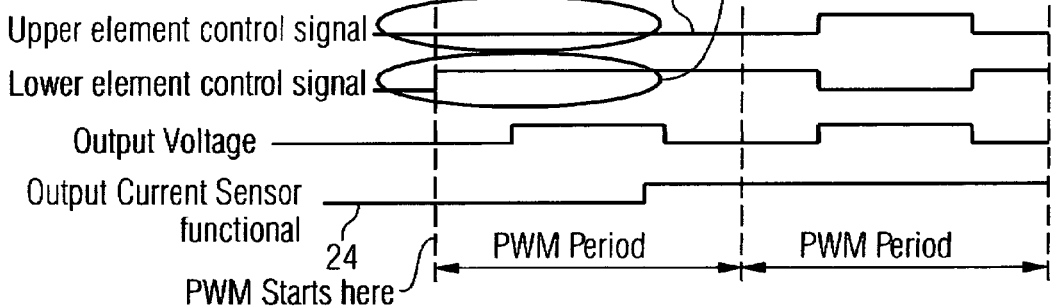

FIGS. 2A and 2B illustrate the difference between the prior art and the described embodiment.

In FIG. 2A, the prior art arrangement is shown which would utilize the components shown in broken outline. It will be seen that the upper two signals 20 and 21 to the switch drivers and hence the switches are on before the output sensor is functional as represented by the lower line 22.

In FIG. 2B, the specific embodiment arrangement is shown and it will be seen that the upper switch control signal 23 remains off until the second pulse width modulated period this being after the output current sensor is operational as represented by the line 24. The lower switch is activated at the start of the first pulse width modulated period but this is protected by the negative DC current sensor and trip 12 until the output current sensor is operational.

Although modifications and changes may be suggested by those skilled in the art, it is the intention of the inventor to embody within the patent warranted hereon all changes and modifications as reasonably and properly come within the scope of his or her contribution to the art.

I claim as my invention:

1. An inverter with a high and a low side, comprising:
   a low slide switching element and a high side switching element;
   a low side current sensor configured to sense current at the low side during at least a first phase of initiation of the inverter;

an output current sensor, separate from said low side current sensor, configured to monitor current provided by the inverter to a load during use of the inverter after said first phase of initiation;

a control circuit configured to control the low and high side switching elements and to respond to a signal from the output current sensor indicating that the sensor is operating, to by then powering up the high side switching element.

2. An inverter as claimed in claim 1 wherein the low side current sensor is responsive to a detected current overload condition to provide trip signal.

3. An inverter as claimed in claim 1 wherein output current sensor is responsive to a detected current overload condition to provide a trip signal.

4. An inverter as claimed in claim 3 wherein the control circuit is responsive to the trip or trip signals to set the switching elements to an off condition.

5. A method for controlling an inverter having high and low side switching elements and an output current sensor, said method comprising the steps of:

activating the low side switching element;

monitoring the output current sensor to determine when an operational state is reached; and upon determining the current sensor is operational, automatically activating the high side switching element.

6. A method as claimed in claim 5 comprising, from the current sensor, providing a trip signal in the event of an over current condition and de-activating the switching elements in response to the trip signal.

7. A method as claimed in claim 5 comprising detecting a low side current and, in response to an over current condition being detected, de-activating the low side switching element.

* * * * *